(12) United States Patent  (10) Patent No.: US 8,094,189 B2
Kumon  (45) Date of Patent: Jan. 10, 2012

(54) OPERATING DEVICE

(75) Inventor: Hitoshi Kumon, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1018 days.

(21) Appl. No.: 12/010,627

(22) Filed: Jan. 28, 2008

(65) Prior Publication Data

US 2008/0197996 A1   Aug. 21, 2008

(30) Foreign Application Priority Data

Jan. 30, 2007  (JP) .................. 2007-019788
Apr. 13, 2007  (JP) .................. 2007-106011

(51) Int. Cl.
*H04N 7/18*  (2006.01)
*G06F 12/00*  (2006.01)

(52) U.S. Cl. ..................................................... 348/115

(58) Field of Classification Search .......... 348/115–118; 340/461
See application file for complete search history.

(56) References Cited

U.S. PATENT DOCUMENTS

| | | | | |
|---|---|---|---|---|
| 5,883,739 A * | 3/1999 | Ashihara et al. ............. | 359/462 |
| 6,388,639 B1 | 5/2002 | Hoshino et al. | |
| 6,587,784 B1 * | 7/2003 | Okude et al. .................. | 701/208 |
| 6,694,194 B2 | 2/2004 | Oda et al. | |
| 6,768,813 B1 * | 7/2004 | Nakayama .................... | 382/154 |
| 7,002,556 B2 | 2/2006 | Tsukada et al. | |
| 7,343,026 B2 | 3/2008 | Niwa et al. | |
| 7,376,510 B1 * | 5/2008 | Green ........................... | 701/209 |
| 2002/0041260 A1 | 4/2002 | Grassmann | |
| 2004/0141634 A1 | 7/2004 | Yamamoto et al. | |
| 2004/0246261 A1 * | 12/2004 | Akitsune et al. ............. | 345/581 |
| 2004/0254699 A1 | 12/2004 | Inomae et al. | |
| 2005/0063564 A1 | 3/2005 | Yamamoto et al. | |
| 2005/0122584 A1 * | 6/2005 | Ishikawa et al. ............. | 359/463 |
| 2005/0238202 A1 | 10/2005 | Sato et al. | |

FOREIGN PATENT DOCUMENTS

| | | |
|---|---|---|
| DE | 196 05 427 A1 | 8/1997 |
| DE | 199 48 896 C1 | 1/2001 |
| DE | 100 39 432 C1 | 12/2001 |
| DE | 10 2004 033 480 A1 | 2/2006 |
| EP | 1 798 588 A1 | 6/2007 |
| JP | A-03-046724 | 2/1991 |

(Continued)

OTHER PUBLICATIONS

German Office Action issued in Patent Application No. 10 2008 000 192.9-53, dated Aug. 23, 2010 (with translation).

(Continued)

*Primary Examiner* — Zarni Maung
(74) *Attorney, Agent, or Firm* — Oliff & Berridge, PLC

(57) ABSTRACT

The invention relates to an operating device that includes: an operating portion in which an operation switch is disposed; a display portion that allows stereoscopic vision to be viewed by naked-eye; an image pickup mechanism that takes pictures of a hand of a user operating the operating portion, from a plurality of directions; and a displayed image generation device that generates a stereoscopic image of the hand based on parallax images obtained from the image pickup device. An operation menu image that depicts a position of the operation switch in the operating portion and a function of the operation switch, and a stereoscopic image of the hand generated by the displayed image generation device, and the compounded image is displayed in the display.

6 Claims, 15 Drawing Sheets

FOREIGN PATENT DOCUMENTS

| | | |
|---|---|---|
| JP | A-05-150925 | 6/1993 |
| JP | A-06-274270 | 9/1994 |
| JP | A-07-064709 | 3/1995 |
| JP | A-09-190278 | 7/1997 |
| JP | A-10-207620 | 8/1998 |
| JP | A-10-269012 | 10/1998 |
| JP | A-10-333094 | 12/1998 |
| JP | A-11-015401 | 1/1999 |
| JP | A-2000-006687 | 1/2000 |
| JP | A-2000-066784 | 3/2000 |
| JP | A-2000-075991 | 3/2000 |
| JP | A-2001-174268 | 6/2001 |
| JP | A-2001-216069 | 8/2001 |
| JP | A-2001-282428 | 10/2001 |
| JP | A-2002-132487 | 5/2002 |
| JP | A-2003-005912 | 1/2003 |
| JP | A-2003-104122 | 4/2003 |
| JP | A-2003-248434 | 9/2003 |
| JP | A-2004-012626 | 1/2004 |
| JP | A-2004-026046 | 1/2004 |
| JP | A-2004-026078 | 1/2004 |
| JP | A-2004-198971 | 7/2004 |
| JP | A-2004-213038 | 7/2004 |
| JP | A-2004-258714 | 9/2004 |
| JP | A-2004-334590 | 11/2004 |
| JP | A-2004-341388 | 12/2004 |
| JP | A-2005-141102 | 6/2005 |
| JP | A-2005-189323 | 7/2005 |
| JP | A-2005-196530 | 7/2005 |
| JP | A-2005-254851 | 9/2005 |
| JP | A-2005-335510 | 12/2005 |
| JP | A-2005-338977 | 12/2005 |
| JP | A-2006-151364 | 6/2006 |
| WO | WO 01/94156 A2 | 12/2001 |

OTHER PUBLICATIONS

Feb. 17, 2011 Office Action issued in U.S. Appl. No. 12/065,811.
Apr. 22, 2009 Office Action issued in Japanese Patent Application No. 2005-256926 with English translation.
Jan. 3, 2007 Search Report issued in International Application No. PCT/IB2006/002442.
Jan. 3, 2007 Written Opinion issued in International Application No. PCT/IB2006/002442.

* cited by examiner

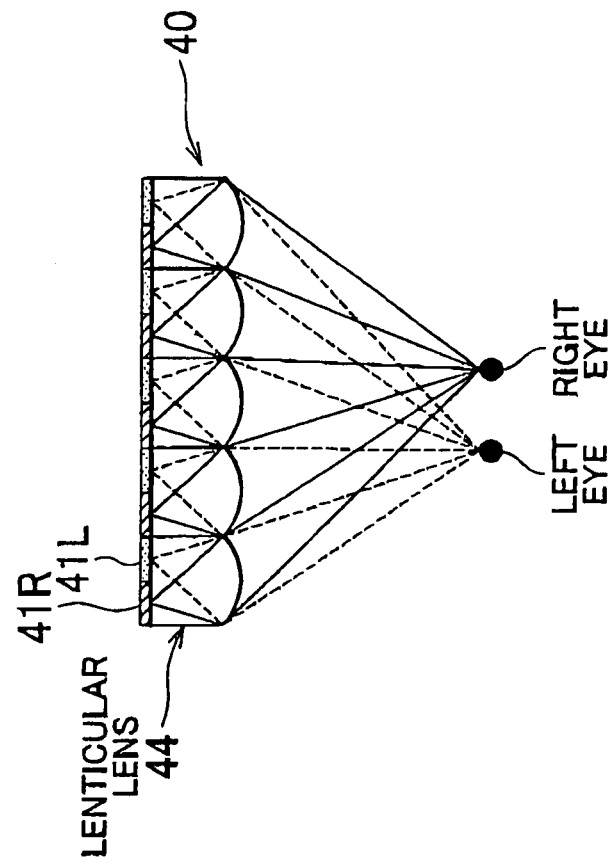
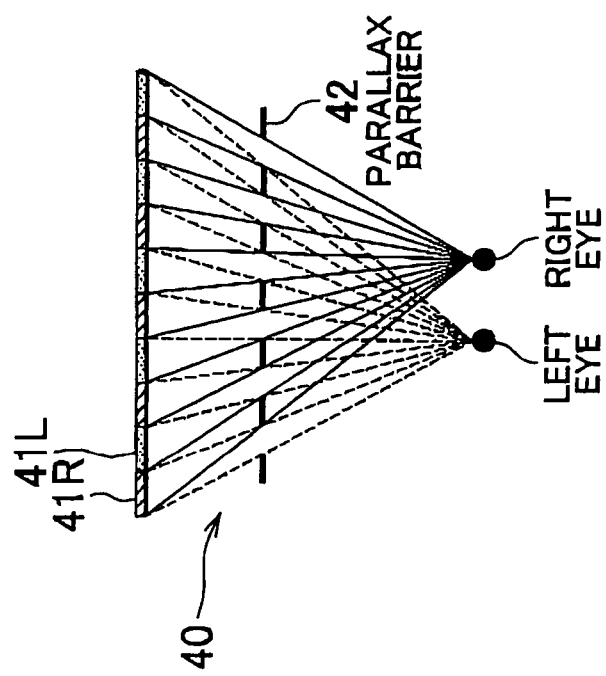

[RELATED-ART PROMPTER SYSTEM]

[REFLECTION SYSTEM]

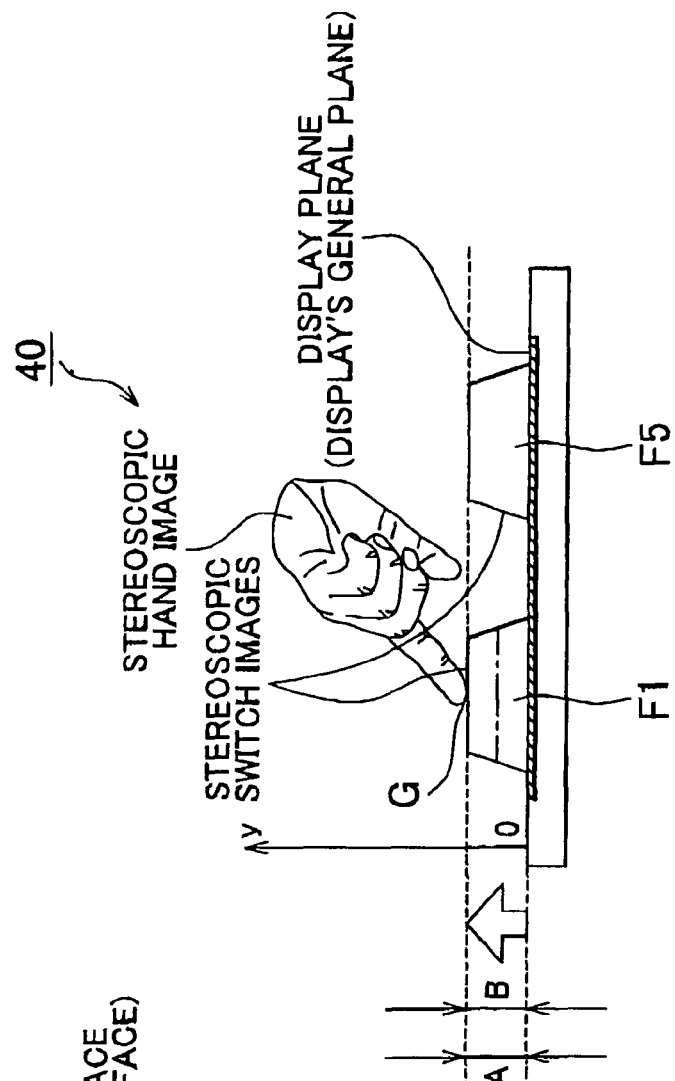
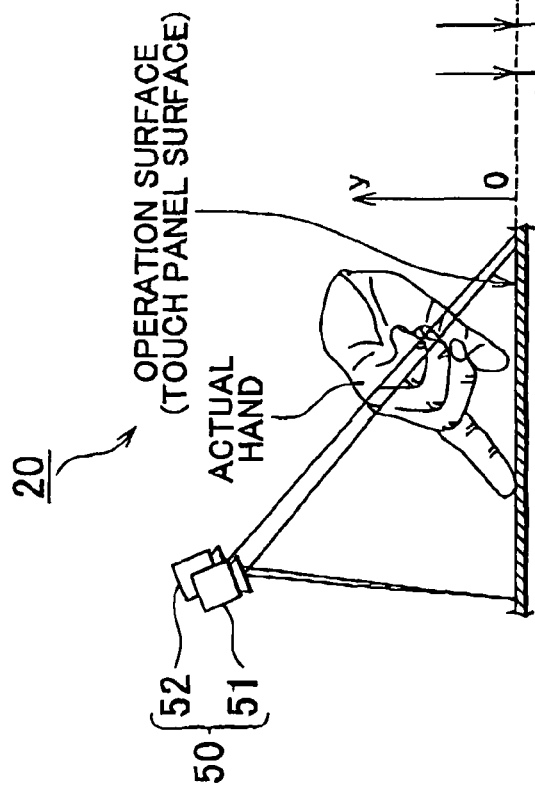

OPERATING DEVICE

INCORPORATION BY REFERENCE

The disclosures of Japanese Patent Applications Nos. 2007-019788 filed on Jan. 30, 2007 and 2007-106011 filed on Apr. 13, 2007, each including the specification, drawings and abstract, are incorporated herein by reference in their entireties.

BACKGROUND OF THE INVENTION

1. Field of the Invention

The invention relates to an operating device that superimposes an image of a hand of a user operating an operating portion on an operation menu image.

2. Description of the Related Art

There is a known vehicle-mounted appliances switch safety operating system characterized by including: a multifunction switch operation plate in which a plurality of kinds of switches for actuating or operating various vehicle-mounted appliances are arranged in a concentrated manner; a display that is disposed at a suitable position in the vehicle within a visual field region such that the operator can see the display by looking forward and that displays in its screen an image of the arrangement of the switches, and a controller as follows. That is, when the operator operates a target one of the switches with a finger, the controller has the operator recognize the position and the function of the image of the target switch displayed in the screen of the display on the basis of a detection signal that is generated when the target switch is sensed. This safety operation system allows the operator to visually recognize the image of the target switch displayed in the display while looking forward, and also allows the operator to operate the target switch in the multifunction switch operation plate with the finger in real time (e.g., see, for example, Japanese Patent Application Publication No. 2000-6687 (JP-A-2000-6687).

There is also a known operating device that includes: a touch panel type display in which switches that the operator operates by touching are provided in a display screen; and a reflecting optical system having a first mirror means whose reflection surface is directed to the user; second mirror means that reflects the image displayed in the touch panel type display as a reflected image to the reflection surface of the first mirror means (e.g., Japanese Patent Application Publication No. 2005-335510 (JP-A-2005-335510)). In this operating device, the picture screen displayed in the touch panel type display that is touch-operated by a user is displayed to the user via the reflecting optical system made up of the first and second mirror means.

In the construction of the prompter system as disclosed in Japanese Patent Application Publication No. 2000-6687 (JP-A-2000-6687), the picture of a hand of a user operating the operating portion is taken by a camera, and the image of the hand is superimposed on the operation menu image displayed by the display portion. Therefore, this construction facilitates the so-called blind-touch operation of vehicle-mounted appliances.

However, in the construction of the prompter system as disclosed in Japanese Patent Application Publication No. 2000-6687 (JP-A-2000-6687), the image of the hand displayed by the display portion is generated on the basis of image data from one camera, so that only two-dimensional display is possible. Therefore, the user operates the operation switches in the operating portion while looking at the image of the hand that appears as planar as the operation menu image, so that it is difficult to grasp the sense of the distance between an operating switch and the hand. Thus, the operability is not very good.

On the other hand, in the construction of the reflection system disclosed in Japanese Patent Application Publication No. 2005-335510 (JP-A-2005-335510) (a construction in which the user's hand operating the operating portion is shown to the user by mirror), the hand is stereoscopically reflected in the user's eyes, so that the sense of the distance between the operation switch and the hand can easily be grasped, and the operability becomes very good.

SUMMARY OF THE INVENTION

It is an object of the invention to provide an operating device that adopts a construction of the prompter system and is capable of securing substantially the same operability as that of the construction of the reflection system.

An operating device in accordance with a first aspect of the invention includes: an operating portion in which an operation switch is disposed; a display that allows naked-eye stereoscopic vision; image pickup mechanism that takes pictures of a hand of a user operating the operating portion, from a plurality of directions; and a displayed image generation device that generates a stereoscopic image of the hand based on parallax images obtained from the image pickup mechanism, wherein the displayed image generation device displays in the display a compounded image obtained by compounding an operation menu image that depicts a position of the operation switch in the operating portion and a function of the operation switch, and the stereoscopic image of the hand generated by the displayed image generation device.

In the operating device in accordance with the first aspect, the operating portion and the display may be disposed between a driver's seat and a navigator's seat in the cabin in the vehicle width direction. The image pickup mechanism may include at least two image pickup devices that look obliquely downward at the operating portion from a driver's seat side and are in the vehicle width direction. The displayed image generation device may generate the stereoscopic image of the hand in a sight line direction from the driver's seat side based on the parallax images obtained from the two image pickup devices.

In the operating device in accordance with the first aspect, the operating portion and the display may be disposed between a driver's seat and a navigator's seat in a vehicle width direction within a cabin. The operating device may further include operator determination device that determines whether the operating portion is being operated from a driver's seat side or from a navigator's seat side. The displayed image generation device may generate the stereoscopic image of the hand in a sight line direction from the driver's seat side if it is determined by the operator determination device that the operating portion is being operated from the driver's seat side. The displayed image generation device may generates the stereoscopic image in a sight line direction from the navigator's seat side if it is determined by the operator determination device that the operating portion is being operated from the navigator's seat side.

In the operating device described immediately above, the image pickup mechanism may include three or more image pickup device that are apart from each other in the vehicle width direction. The displayed image generation device may generate the stereoscopic image of the hand based on the parallax images obtained from two image pickup device provided at the driver's seat side if it is determined by the operator determination device that the operating portion is being operated from the driver's seat side. The displayed image generation device may generate the stereoscopic image of the hand based on the parallax images obtained from two image pickup device provided at the navigator's seat side if it is determined by the operator determination device that the operating portion is being operated from the navigator's seat side.

In the foregoing operating device, the image pickup mechanism may include at least two image pickup devices that are movable in the vehicle width direction. The displayed image generation device may move the two image pickup devices based on a result determined by the operator determination portion in the vehicle width direction. The displayed image generation device may generate the stereoscopic image of the hand based on the parallax images obtained from two image pickup device moved to the driver's seat side if it is determined by the operator determination device that the operating portion is being operated from the driver's seat side. The displayed image generation device may generate the stereoscopic image of the hand based on the parallax images obtained from two image pickup device moved to the navigator's seat side if it is determined by the operator determination device that the operating portion is being operated from the navigator's seat side.

In the operating device in accordance with the first aspect, in the display, an image portion in the operation menu image that represents the operation switch may be stereoscopically displayed, and the stereoscopic image of the hand may be displayed while a first reference plane of zero height that is a plane offset by a predetermined height from a display plane of the display is used.

In the foregoing operating device, the image portion in the operation menu image that represents the operation switch may be stereoscopically displayed while the display plane of the display is used as a second reference plane of zero height, and the predetermined height by which the reference plane of zero height is offset from the display plane of the display may be substantially equal to a stereoscopic height of the image portion that represents the operation switch.

In the operating device as described above, the height of a finger of the hand displayed in the stereoscopic image of the hand from the display plane of the display when the finger touches the operating portion may be substantially equal to a stereoscopic height of the image portion that represents the operation switch in the operation menu image.

According to the invention, an operating device that adopts a construction of the prompter system and is able to secure substantially the same operability as that of the construction of the reflection system can be obtained.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIGS. 3A and 3B are principle diagrams of a display portion 40 that utilizes a parallax division system;

FIGS. 15A and 15B are diagrams schematically showing a relative height relationship between the stereoscopic switch image and the stereoscopic hand image.

DETAILED DESCRIPTION OF THE EMBODIMENTS

Best modes for carrying out the invention will be described hereinafter with reference to the drawings.

Figure 1:
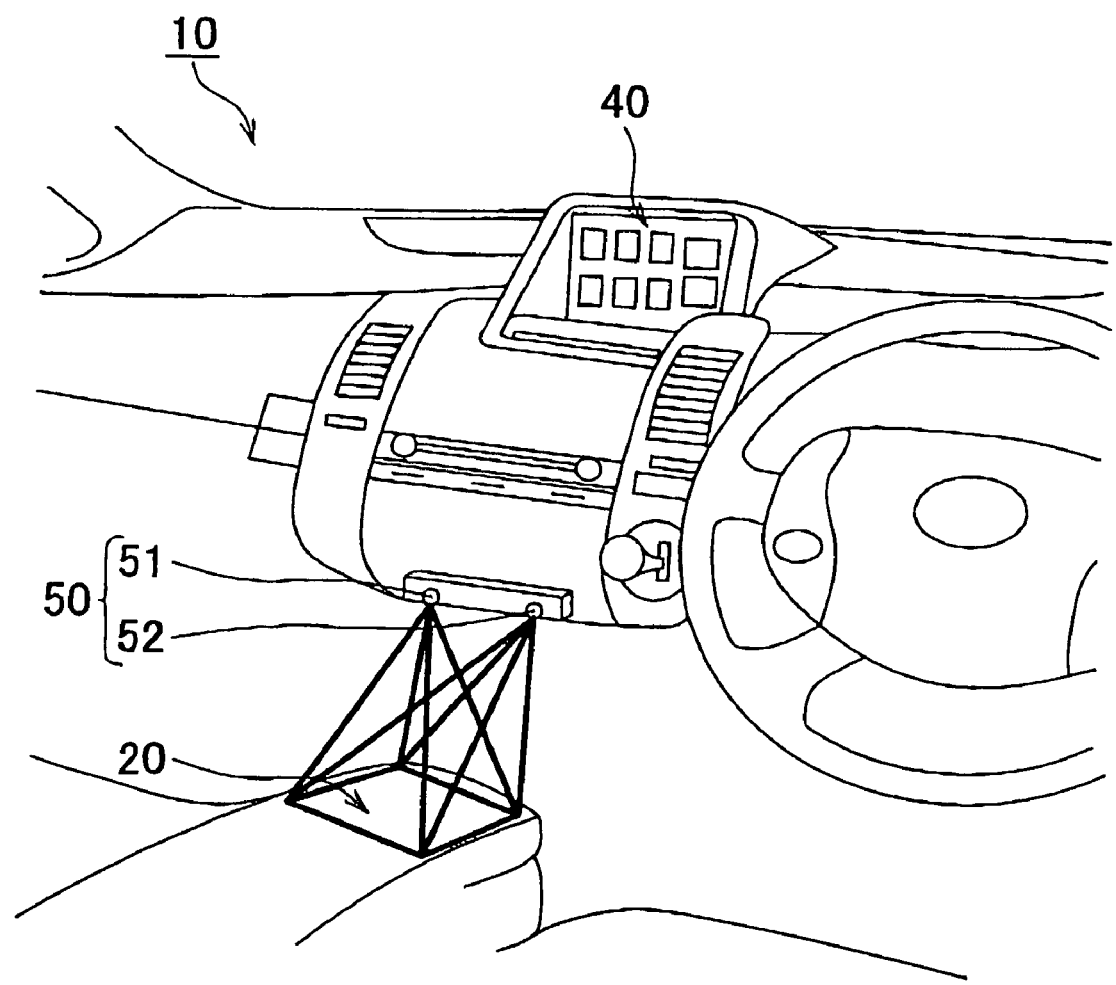
FIG. 1 is a perspective view of first embodiment of an operating device 10 in accordance with the invention in a vehicle-mounted state.
Figure 2:
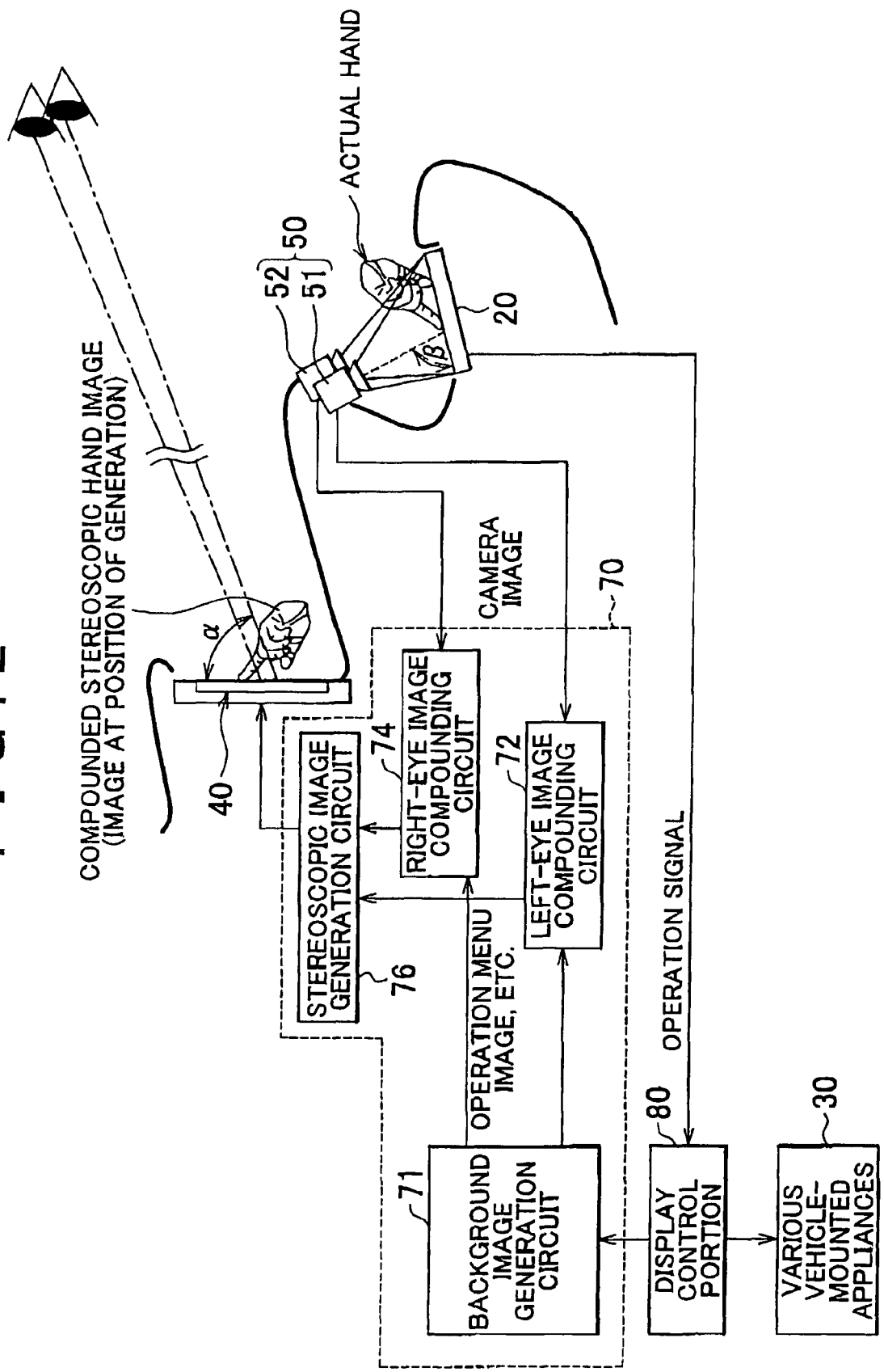
FIG. 2 is a diagrammatic side sectional view of the operating device 10 show in FIG. 1.

FIG. 1 is a perspective view of first embodiment of an operating device 10 in accordance with the invention in a vehicle-mounted state. FIG. 2 is a diagrammatic side sectional view of the operating device 10 show in FIG. 1, together with function blocks. The operating device 10, as shown in FIG. 1, includes a operating portion 20, a display portion 40 and a camera 50. The operating portion 20 and the display portion 40 are disposed in a cabin separately at positions that are physically apart from each other.

The operating portion 20 is constructed of a touch panel. The operating portion 20 is disposed at such a position that a driver can easily reach and operate the operating portion 20 with a hand. For example, the operating portion 20 is disposed in a console box as shown in FIG. 1. Or, the operating portion 20 may also be disposed at an operator or user side of the display portion 40 disposed in an instrument panel. The operating portion 20 is disposed so that its generally flat operating surface becomes substantially horizontal.

The operating portion 20 may be an ordinary touch panel construction, or may also be a transparent touch panel capable of emitting light. The transparent touch panel has, for example, a laminate structure in which a glass substrate provided with a thin-film transparent electrode is disposed on a lower side and a film substrate provided with a thin-film transparent electrode is disposed on an upper side so that the thin-film transparent electrodes face each other across a dot spacer. An operation signal (operation position signal) on the transparent touch panel is supplied to a display control portion 80 (see FIG. 2) via an FPC (flexible printed circuit) that is adhered to a side portion of the transparent touch panel. The display control portion 80 realizes various functions (such as the switching of operation menu images and controls of various vehicle-mounted appliances 30 as described below) in accordance with the operation signal (operation position signal) supplied from the transparent touch panel. The light emission of the transparent touch panel may be realized by, for example, an LED that causes blue light emission from the transparent touch panel. Incidentally, there is no need to provide a display, such as a touch panel type display, behind the transparent touch panel of the operating portion 20 (i.e., it is not necessary that the operation switches provided in the operating portion 20 be displayed in the operating portion 20).

The display portion 40 is constructed of a display that allows stereoscopic image to be viewed by naked-eye. The display portion 40 that allows stereoscopic image to be viewed by naked-eye may be realized, for example, by using a sight-line parallax division system (both-eye convergence system), such as a parallax barrier system, a lenticular system, etc., or may also be realized by using a DFD (depth fused 3D) system.

In the case of the parallax barrier system, the display portion 40 is constructed as shown in the principle diagram in FIG. 3A, that is, left-eye pixel regions 41L and right-eye pixel regions 41R are set alternately in a horizontal direction in each of arrays of pixels (e.g., arrays of pixels formed by a TFT crystal liquid cell). A parallax barrier (a set of vertical slits) 42 is disposed so that light from the left-eye pixel regions 41L reaches only the left eye and the light from right-eye pixel regions 41R reaches only the right eye. The parallax barrier 42 may be constructed of an electronically controllable switch liquid crystal cell. Besides, the parallax barrier 42 may be set at a location that is behind the arrays of pixels and that is at the operator side of a light source.

In the case of the lenticular system, the display portion 40 is constructed as shown by a principle diagram in FIG. 3B, that is, left-eye pixel regions 41L and right-eye pixel regions 41R are set alternately in a horizontal direction in a screen and a multi-cylindrical lenticular lens 44 is provided so that light from the left-eye pixel regions 41L reaches only the left eye and light from the right-eye pixel regions 41R reaches only the right eye. Thus, in the parallax division system, images different for the left and right eyes of a person are produced, so that depth perception is caused.

In the case of the DFD system, the display portion 40 is constructed by superimposing two transparent TFT liquid crystal cells over each other with an appropriate space therebetween. Identical images that are different in brightness are displayed on the front and rear transparent TFT liquid crystal cells. Thus, in the DFD system, the changing of the brightness ratio between the identical images superimposed on the front and rear sides causes perception of depth continuous between the two planes.

The display portion 40 may be disposed at a location that a user can easily see, that is, a location that a driver can see without considerably changing the driver's visual field while driving. For example, the display portion 40 is disposed in a central portion in an upper surface of the instrument panel as shown in FIG. 1. Or, the display portion 40 may also be disposed within a meter panel. Besides, the display portion 40 may also be angled toward the driver so as to facilitate stereoscopic perception.

The camera 50 (image pickup means) is a stereo camera (two-lens camera) made up of two cameras 51, 52 that are disposed apart from each other in a vehicle width direction. In the following description, the camera 51 on a navigator's seat side (the left side in a vehicle with a right-side steering wheel) in the vehicle width direction will also be termed "the left-eye camera 51", and the camera 52 on the driver's seat side (the right side in the vehicle with a right-side steering wheel) in the vehicle width direction will also be termed "the right-eye camera 52", as needed. The cameras 51, 52 are each, for example, a small-size color camera that employs a CCD or a CMOS as image pickup elements, and are disposed so as to look down at the operating portion 20 (and a user's hand operating the operating portion 20) from different directions. In the example shown in the drawing, the left-eye camera 51 is disposed on the navigator's seat side of a center of the operating portion 20 in the vehicle width direction so as to take images of the entire operating portion 20 in a obliquely downward direction from the navigator's seat side. The right-eye camera 52 is disposed on the driver's seat side of the center of the operating portion 20 in the vehicle width direction so as to take images of the entire operating portion 20 in a obliquely downward direction from the driver's seat side. Thus, the cameras 51, 52 are disposed so as to take images of the operating portion 20 with the parallax and the convergence angle that correspond to the parallax and the convergence angle occurring when a user see the display portion 40. Therefore, it becomes possible to acquire stereo information about a user's hand operating the operating portion 20.

When a user operates the operating portion 20, a hand of the user comes into the image-taking areas of the cameras 51, 52 in order to operate the operating portion 20, so that the cameras 51, 52 take images of the hand operating the operating portion 20. The camera images containing images of the hand are supplied to a display image generation circuit 70 (see FIG. 2).

The display image generation circuit 70 generates images suitable to be displayed in the display portion 40 that allows stereoscopic image to be viewed by naked-eye under the control of the display control portion 80.

The display image generation circuit 70, as shown in FIG. 2, includes a background image generation circuit 71, a left-eye image compounding circuit 72, a right-eye image compounding circuit 74, and a stereoscopic image generation circuit 76.

Figure 4:
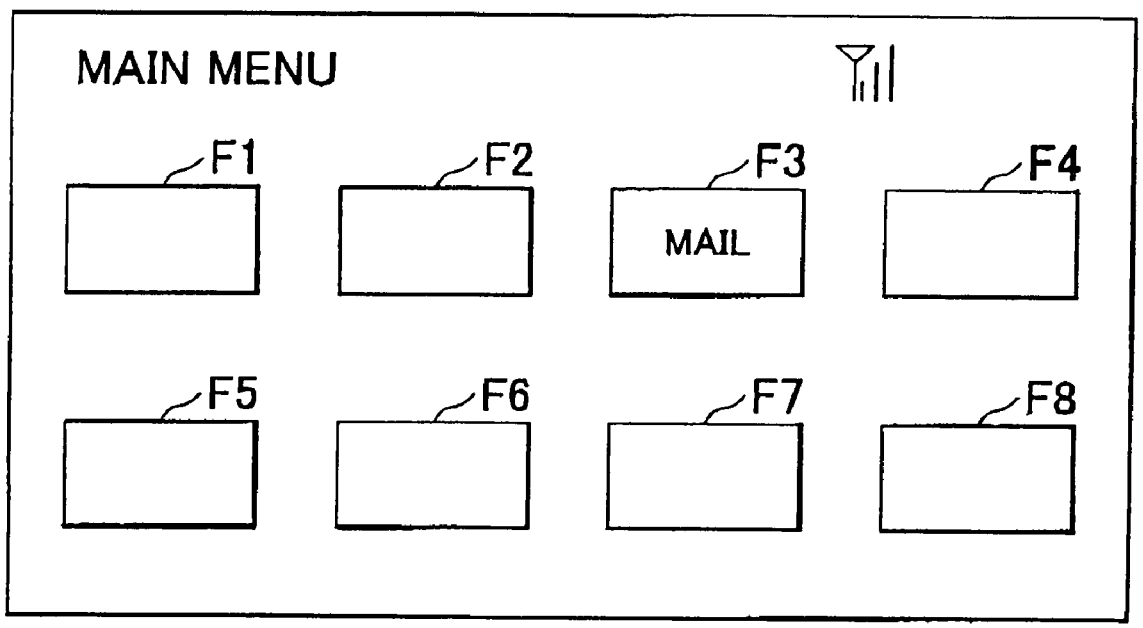
FIG. 4 is a diagram showing an example of a operation menu image.

The background image generation circuit 71 generates a background image displayed in the display portion 40. The background image is an operation menu image as shown in FIG. 4. Besides, the background image may include map images of a navigation system, and the like. The operation menu image depicts the positions and functions of operation switches (touch switches) of the operating portion 20. The operation menu image serves to inform the user of the various functions that are realized by operating the operation switches and of the positions of the individual operation switches that are operated in order to realize the corresponding functions.

In an example shown in FIG. 4, the operation menu image contains graphic images F1 to F8 that represent eight operation switches provided in the operating portion 20. A user, seeing the operation menu image, understands that the operation switches are arranged in two rows, that is, front and rear rows, and also understands that what functions are realized by operating the individual operation switches, by seeing or reading the characters shown in the graphic images F1 to F8. For example, the user will understand that, if the user desires to send an Email, it is appropriate to press the operation switch present at a position that corresponds to the graphic image F3 that contains the characters "MAIL", that is, the third operation switch from the left in the front row.

Incidentally, various kinds of operation menu images may be prepared, and may be appropriately changed by switching in accordance with the situation of the user's operation with respect to the operation switches of the operating portion 20. In this case, in accordance with the changing or switching among the operation menu images, the positions and functions of operation switches in the operating portion 20 are changed. This construction allows realization of the operation switches for many vehicle-mounted appliances 30 in the operating portion 20, and allows efficient aggregation of operation switches. For example, the operating portion 20 may incorporate various operation switches for not only the operations of information and communications-related vehicle-mounted appliances, such as mailing, telephoning, guide for neighboring facilities, etc., but also various operations of an air-conditioning device, an audio device, etc., although not shown in FIG. 4.

The left-eye image compounding circuit 72 generates a left-eye image on the basis of an operation menu image from the background image generation circuit 71 and a camera image from the left-eye camera 51. Concretely, the left-eye image compounding circuit 72 firstly extracts only an image of a hand (hereinafter, referred to as "hand image") from a camera image supplied from the left-eye camera 51. The extraction of a hand image may be realized by utilizing a difference in chromaticity (color saturation) or contrast between the hand and a portion other than the hand that is contained in the camera image (the operating portion 20). Typically, the extraction of a hand image uses a chroma key compounding technique that is widely known. In this technology, the compounding is performed by taking an image against a background of a particular color (key color), and superimposing another image on the key color background. The color commonly used as a key color is blue. A reason for this is that since blue is the most opposite to a human skin color, it is suitable for the process of extracting an image of a human hand. Therefore, the operating portion 20 is colored with the key color (e.g., blue) or is caused to emit light of the key color, and the blue portion is taken out from the camera image by the chroma key technique, so that only the image of the hand is left. Incidentally, there are other methods of extracting the hand image, for example, a luminance compounding technique (a method in which a certain brightness signal is specified among the luminance signals that contain information regarding the brightness and contrast of images, and only the brightness signals below or above the specified signal are extracted, or the like. In the following description, however, a case where the chroma key compounding technique is mainly used will be described.

The left-eye image compounding circuit 72, after extracting a hand image, compounds the extracted hand image with the operation menu image from the background image generation circuit 71 to generate a left-eye image. The thus-generated left-eye image is supplied to the stereoscopic image generation circuit 76.

Likewise, the right-eye image compounding circuit 74 generates a right-eye image on the basis of the operation menu image from the background image generation circuit 71 and the camera image from the right-eye camera 52. In the right-eye image compounding circuit 74, an operation menu image that is the same as in the left-eye image compounding circuit 72 is generated. The thus-generated right-eye image is supplied to the stereoscopic image generation circuit 76.

The stereoscopic image generation circuit 76 generates a stereoscopic image compatible with the display portion 40 which allows stereoscopic image to be viewed by naked-eye, on the basis of the left-eye image from the left-eye image compounding circuit 72 and the right-eye image from the right-eye image compounding circuit 74. In this operation, the stereoscopic image generation circuit 76 generates a stereoscopic image such that the operation menu image is reflected as a two-dimensional plane in the user's eyes and the hand image is reflected as a three-dimensional solid in the user's eyes. That is, the stereoscopic image generation circuit 76 generates a stereoscopic image that provides a stereoscopic vision in which the heights and directions of the individual fingers of the hand of the hand image relative to the operation menu image correspond to the actual heights and directions of the fingers or sites of the hand relative to the operating portion 20, with the reference plane of zero height being the display plane of the display portion 40. The stereoscopic image generated by the stereoscopic image generation circuit 76 is displayed in the display portion 40.

In the case where the display portion 40 is of a parallax division system, the stereoscopic image generation circuit 76 divides the left-eye image from the left-eye image compounding circuit 72 at predetermined intervals, and assigns the divided image pieces to left-eye image pixel regions 41L of the display portion 40, and divides the right-eye image from the right-eye image compounding circuit 74 at predetermined intervals, and assigns the divided image pieces to right-eye image pixel regions 41R of the display portion 40. In this manner, the stereoscopic image generation circuit 76 generates a stereoscopic image so that the left-eye image will be reflected only in the user's left eye (light from the left-eye image pixel regions in the display portion 40 will reach only the user's left eye) and so that the right-eye image will be reflected only in the user's right eye (light from the right-eye image pixel regions in the display portion 40 will reach only the user's right eye). Therefore, only the hand image obtained via the left-eye camera 51 is reflected in the user's left eye, and the hand image obtained via the right-eye camera 52 is reflected in the user's right eye. Due to the sight line division regarding the two hand images according to the parallax, it is possible to cause the user to see the image displayed by the display portion 40 (a portion of the stereoscopic image that displays the hand) as if the image were three-dimensional.

In the case where the display portion 40 is of the DFD system, the stereoscopic image generation circuit 76, on the basis of the left-eye image from the left-eye image compounding circuit 72 and the right-eye image from the right-eye image compounding circuit 74, generates a to-be-displayed image that is to be displayed in the two displays on the front and rear sides, and acquires information regarding the heights of the various sites on the hand in the to-be-displayed image relative to the operating portion 20. Next, the stereoscopic image generation circuit 76 determines the brightness of each pixel of the to-be-displayed image on the basis of the height information. In this manner, the stereoscopic image generation circuit 76 generates front and rear-side to-be-displayed images (stereoscopic images) that have brightness differences that correspond to the heights of the various sites on the hand relative to the operating portion 20. This can cause the user's eyes to perceive the image displayed in the display portion 40 (the portion of the stereoscopic image that displays the hand) as if the image were three-dimensional.

FIGS. 5A to 5D show examples of a stereoscopic image. In the following description, the image of the hand in the stereoscopic image will be termed "the stereoscopic hand image". It is to be understood that although in the drawings, the stereoscopic hand image cannot be three-dimensionally presented and therefore is shown as a planar image, the stereoscopic hand image displayed in the display portion 40 actually appears three-dimensional as stated above.

Incidentally, the compounding position of the stereoscopic hand image, that is, where in the operation menu image to compound the stereoscopic hand image, is determined so as to achieve accurate reproduction on the basis of the relative positional relationship between the actual position of the hand and the positions of the operation switches in the operating portion 20 and the relative positional relationship between the position of the hand image and the graphic images F1 to F8 in the display portion 40 (the composite image). Incidentally, the compounding position may be computed on the basis of a relative relationship (coordinate conversion equation) between the coordinate system for the camera image and the coordinate system for the operation menu image.

In the examples shown in FIGS. 5A to 5D, the index finger tip in the stereoscopic hand image is shown at such a position as to operate the graphic image F3. In this case, the user can come to know that if the user performs a switch operation with the index finger while keeping the present position of the hand, the function of the switch that corresponds to the graphic image F3, that is, a mailing function, is realized. Thus, the user can operate a desired operation switch in the operating portion 20 while looking at the display portion 40 instead of directly looking at the operating portion 20. Therefore, in the case where the user is the driver, the user can perform the switching operation on the operating portion 20 that is provided near the hand of the user while looking at the display portion 40 provided forward in the user's visual field (so-called blind-touch operation), without considerably changing the driving posture or the line of sight. Thus, safe switch operation that does not impede the driving can be realized.

Figure 6A:
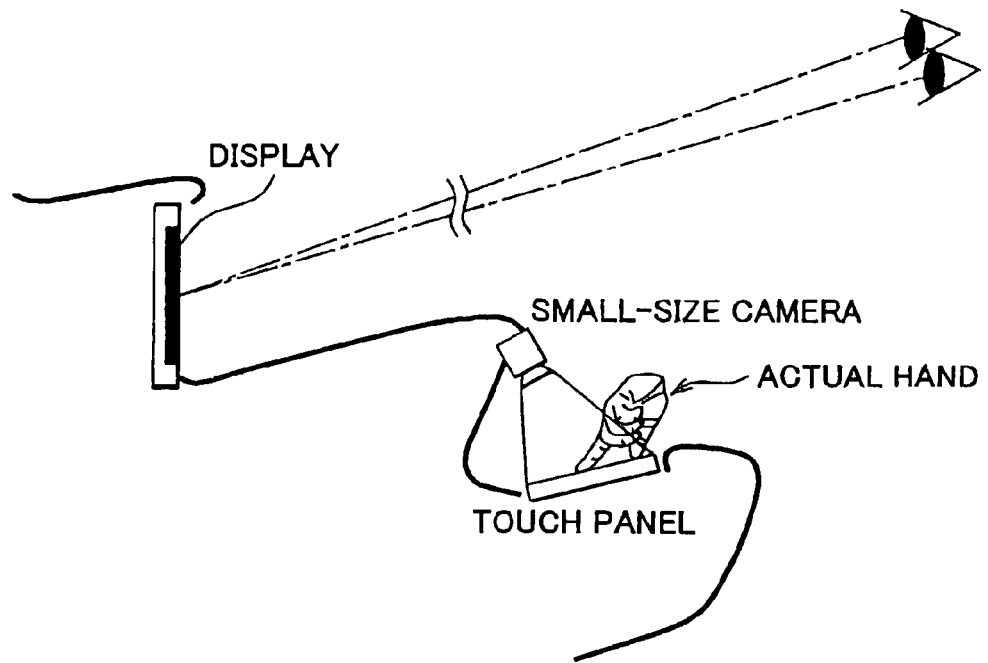
FIGS. 6A and 6B are diagrams showing general constructions of the related-art prompter system and the related-art reflection system, respectively.
Figure 6B:
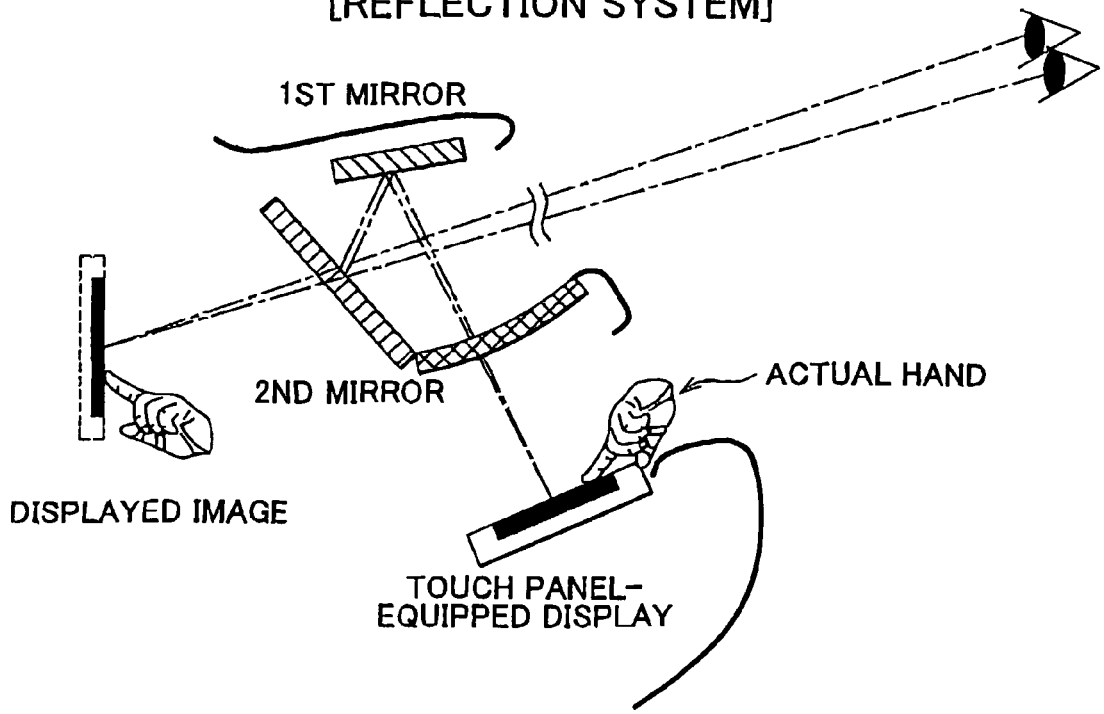

Particularly, in this embodiment, the image of the hand superimposed on the operation menu image appears three-dimensional as described above, so that the operability improves considerably in comparison with the case where the image of the hand appears planar. In a related-art prompter system that employs a camera shown in a simple fashion in FIG. 6A, the image of the hand superimposed on the operation menu image is not provided with three-D information about the hand (three-dimensional information regarding the vicinity of the hand and the finger tips), and therefore comes to be a planar composite image. Therefore, the information obtainable from the hand image is less and the operability is correspondingly lower than, for example, in the reflection type construction as shown in FIG. 6B (in which the user's hand operating the touch panel type display is reflected by first and second mirrors so as to be shown to the user). However, in the embodiment, since a stereoscopic hand image that is substantially the same as the reflected image of the hand shown in the aforementioned reflection system is generated, it is possible to adopt the prompter system and, at the same time, recover the three-dimensional information about the hand that is lost in the related-art prompter system. Therefore, the invention can realize high operability that is comparable to that of the reflection system while adopting the prompter system. Furthermore, according to the embodiment, since a stereoscopic hand image that is substantially the same as the reflected image of the hand that is shown in the reflection system as described above is generated, the regions in the operation menu image that are hidden by the hand image become less than in the related-art prompter system in which the planar hand image is superimposed. Therefore, it becomes correspondingly easier to grasp the positional relationship between the hand and the operation menu image, so that the operability improves.

Furthermore, in the embodiment, as shown in FIG. 2, the angle β of the operating portion 20 with respect to the sight line direction of the camera 50 is set equal or substantially equal to the angle α of the display portion 40 with respect to the user's sight line direction. Therefore, the sight line direction of the camera 50 with respect to the hand substantially corresponds to the sight line direction of the user with respect to the display portion 40 (and therefore the stereoscopic direction of the stereoscopic hand image of the display portion 40) in a side view, so that the operability considerably improves. Besides, according to the foregoing angle relationship, a stereoscopic hand image substantially the same as the reflected image of the hand shown in the foregoing reflection system can be generated without a need for a special process, such as a sight line conversion process or the like, at the time of generation of the stereoscopic hand image.

Figure 5A:
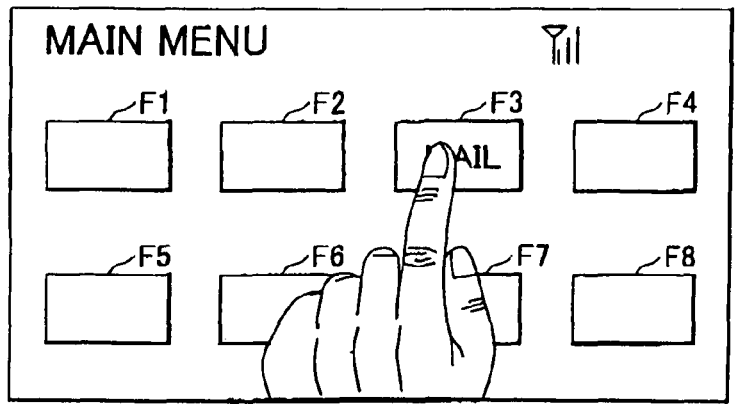
FIGS. 5A, 5B, 5C and 5D are diagrams showing examples of a stereoscopic image.
Figure 5B:
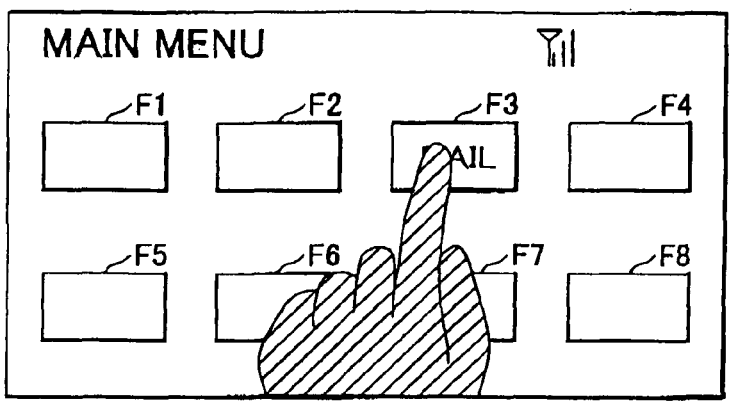

It is to be noted herein that the stereoscopic hand image may be generated by directly using a raw image of a hand as shown in FIG. 5A, or may also be a silhouette type stereoscopic hand image from which vividness of the hand has been removed as shown in FIG. 5B. Besides, the stereoscopic hand image may also be a semi-transparent silhouette type stereoscopic hand image such that the operation menu image behind can be seen. Furthermore, as shown in FIG. 5D, the stereoscopic hand image may also be a stereoscopic hand image obtained by making a raw image of the hand semi-transparent. According to the stereoscopic hand images shown in FIGS. 5B and 5C, it is possible to prevent the instinctively unpleasant sensation that a user can receive from the display of a detailed real image of a hand. Besides, according to the stereoscopic hand images shown in FIGS. 5C and 5D, the regions in the operation menu image that are hidden by the hand image are further lessened, so that it becomes easier to grasp the positional relationship between the operation menu image and the hand. In FIGS. 5A and 5B, too, the stereoscopic parallax provided by the stereo camera 50 lessens the hidden regions in the menu image, and thus improves visibility, as compared with the related-art prompter system in which a two-dimensional image is displayed.

In conjunction with the foregoing first embodiment, the following modifications are conceivable.

In first embodiment described above, since the stereoscopic hand image is generated in a view taken from vertically above as shown in FIG. 5A, the positional relationship between the operation menu image and the hand in the height direction (direction perpendicular to the plane of the screen) can easily be grasped by an operator regardless of whether the operator is an occupant of the driver's seat or an occupant of the navigator's seat. However, taking the importance of the operability for the driver into account, the two cameras 51, 52 may both be disposed on the driver's seat side so as to generate a stereoscopic hand image viewed from the driver's seat side (e.g., see FIG. 9 described below).

Second Embodiment

Figure 7:
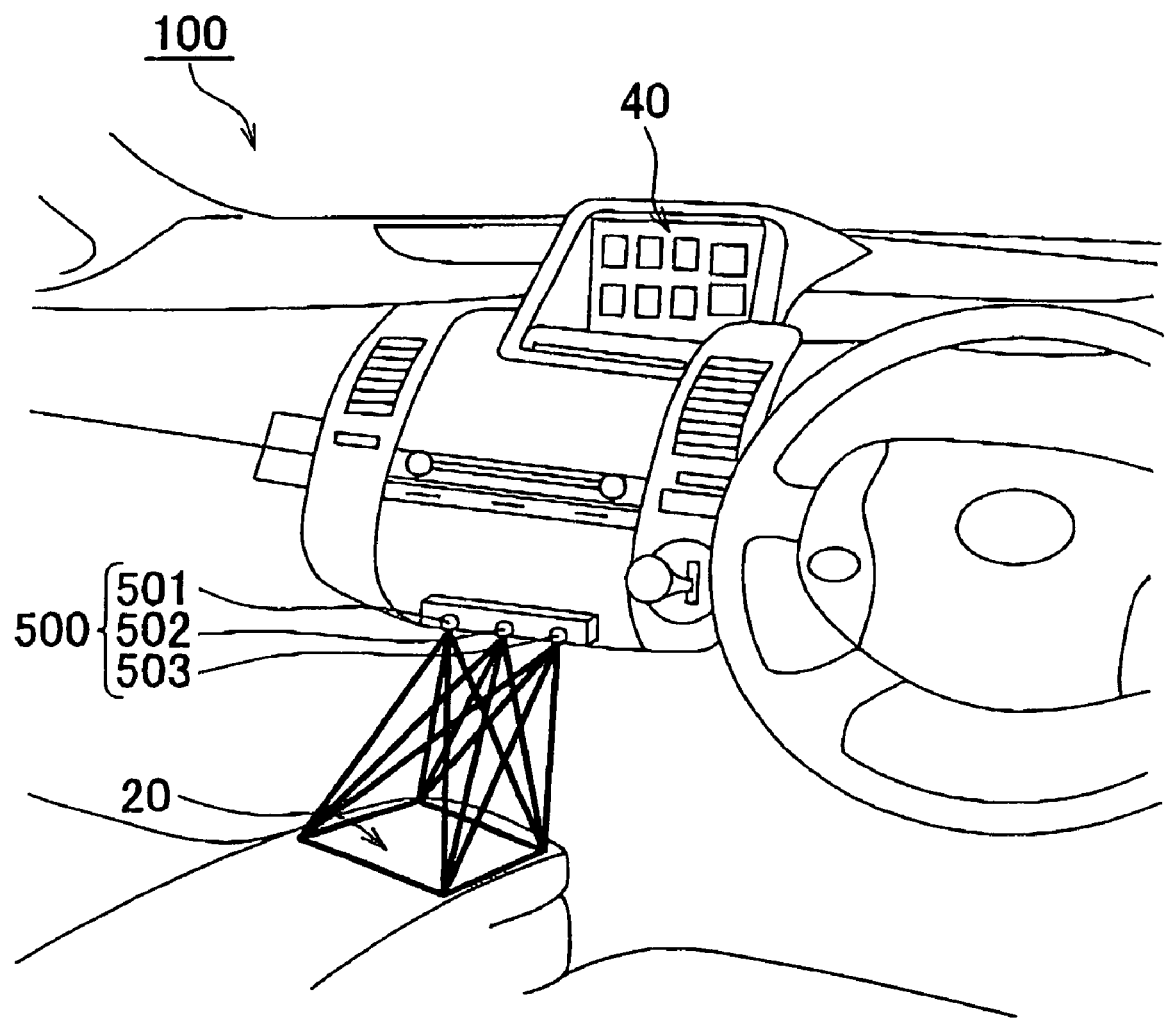
FIG. 7 is a perspective view showing second embodiment of an operating device 100 in accordance with the invention in a vehicle-mounted state.
Figure 8:
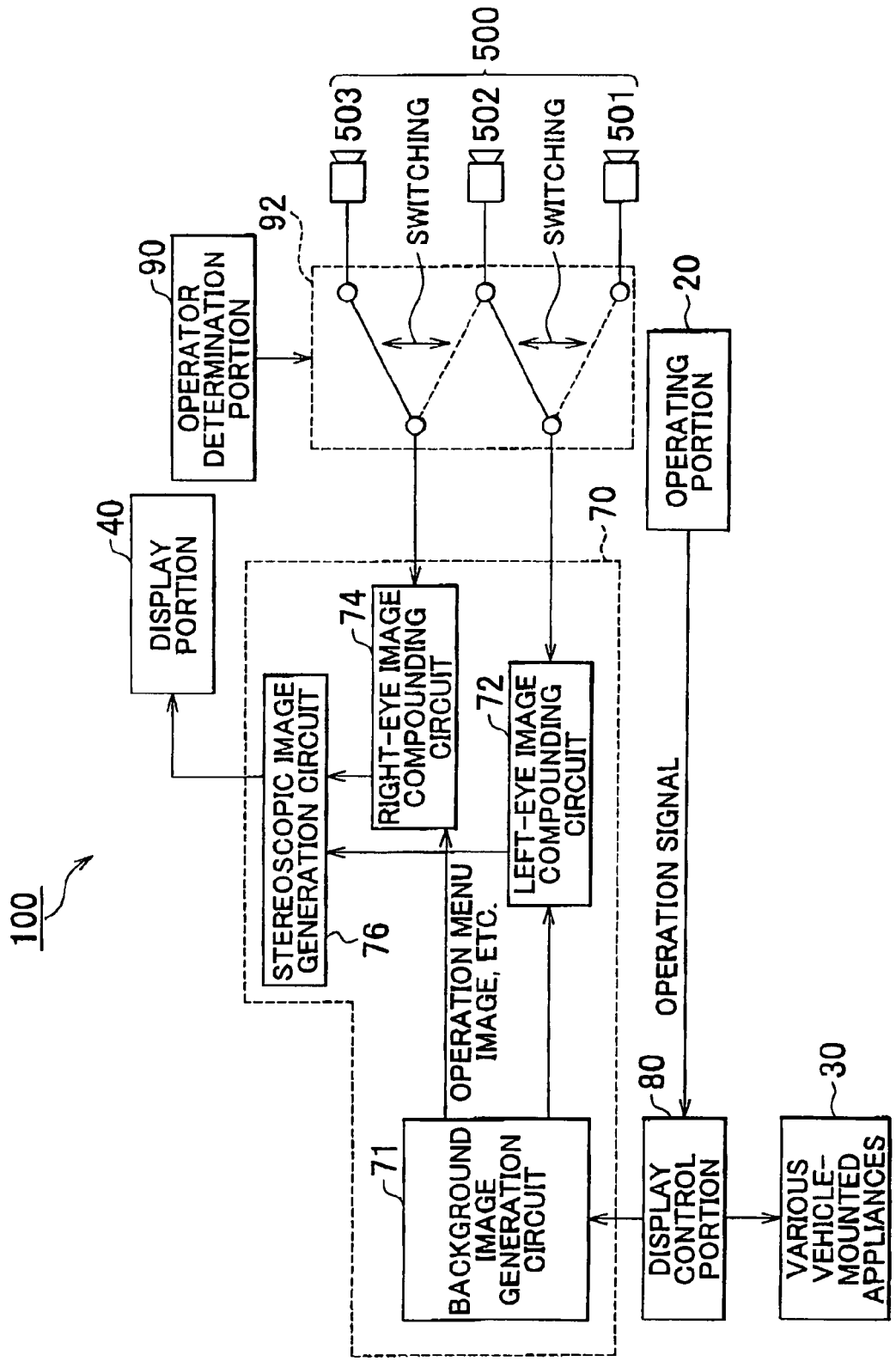
FIG. 8 is a functional block diagram showing main functions of the operating device 100 shown in FIG. 6.

FIG. 7 is a perspective view showing the operating device 100 in accordance with the invention in a vehicle-mounted state as shown in second embodiment. FIG. 8 is a functional block diagram showing main functions of the operating device 100 shown in FIG. 7. In second embodiment, the constructions that may be the same as those in first embodiment are assigned with the same reference characters, and the descriptions thereof are omitted.

Second embodiment has main features in switching a camera image for use for the generation of a stereoscopic hand image in accordance with whether the operating portion 20 is being operated from the driver's seat side or the navigator's seat side. Hereinafter, constructions characteristic of second embodiment will be predominantly described.

A camera 500, as shown in FIG. 7, is a three-lens camera made up of three cameras 501, 502, 503 that are substantially linearly disposed apart from each other in a vehicle width direction. The cameras 501, 502, 503 are each a small-size color camera whose image pickup element is, for example, a CCD or a CMOS, and are disposed so as to look down at the operating portion 20 (and a user's hand operating the operating portion 20) from different directions. In the example shown in FIG. 7, the camera 501 is disposed at the navigator's seat side of the center of the operating portion 20 in the vehicle width direction, and the camera 502 is disposed at or around the center of the operating portion 20 in the vehicle width direction, and the camera 503 is disposed at the driver's seat side of the center of the operating portion 20 in the vehicle width direction. Each of the cameras 501, 502, 503 is disposed so as to take images of the whole of the operating portion 20 in a obliquely downward line of sight from forward in the vehicle. Thus, the two cameras 501, 502, making a pair, are disposed so as to take images of the operating portion 20 with a parallax and a convergence angle that correspond to the parallax and the convergence angle with which the navigator's seat occupant looks at the display portion 40. On the other hand, the two cameras 502, 503, making another pair, are disposed so as to take images of the operating portion 20 with a parallax and a convergence angle that correspond to the parallax and the convergence angle with which the driver looks at the display portion 40.

The operating device 100 includes an operator determination portion 90 and a camera switching portion 92 as component elements that are added to the foregoing construction of first embodiment.

The operator determination portion 90 determines whether the operating portion 20 is being operated from the driver's seat side or from the navigator's seat side. There are a variety of methods for this determination or the like, and any suitable method may be adopted. For example, as a simple method, the operator determination portion 90 may determine that the operating portion 20 is being operated from the driver's seat side (i.e., the operator is the driver), if the hand in the camera image taken by the camera 500 is a left hand. On the other hand, if the hand in the camera image taken by the camera 500 is a right hand, it may be determined that the operating portion 20 is being operated from the navigator's seat side (i.e., the operator is the occupant of the navigator's seat). It is also permissible to provide infrared sensors on both sides of the operating portion 20 in the vehicle width direction (the navigator's seat side and the driver's seat side thereof) and to determine which one of the infrared sensors on the two sides has detected the presence of a hand reaching the operating portion 20. Or, it is also permissible to provide in the vehicle cabin a switch that turns on, for example, when the operating portion 20 is operated from the navigator's seat side, and to determine the operator, that is, determine whether the operator is the driver or the navigator's seat occupant, on the basis of the on/off state of the switch. Furthermore, it is also permissible to determine the operator on the basis of a result of the image recognition via the vehicle-mounted camera or a change in the capacitance of static electricity between the operating portion 20 and each one of the navigator's seat and the driver's seat, etc.

The camera switching portion 92 switches the sate of connection of the cameras 501, 502, 503 to the left-eye image compounding circuit 72 and the right-eye image compounding circuit 74 in accordance with the result of the determination from the operator determination portion 90. Concretely, in the case where the operating portion 20 is being operated from the driver's seat side, the camera switching portion 92 performs the switching so that the camera image from the camera 502 is input to the left-eye image compounding circuit 72 and the camera image from the camera 503 is input to the right-eye image compounding circuit 74 as shown by solid lines in FIG. 8. On the other hand, in the case where the operating portion 20 is being operated from the navigator's seat side, the camera switching portion 92 performs the switching so that the camera image from the camera 501 is input to the left-eye image compounding circuit 72 and the camera image from the camera 502 is input to the right-eye image compounding circuit 74 as shown by dotted lines in FIG. 8.

Figure 9:
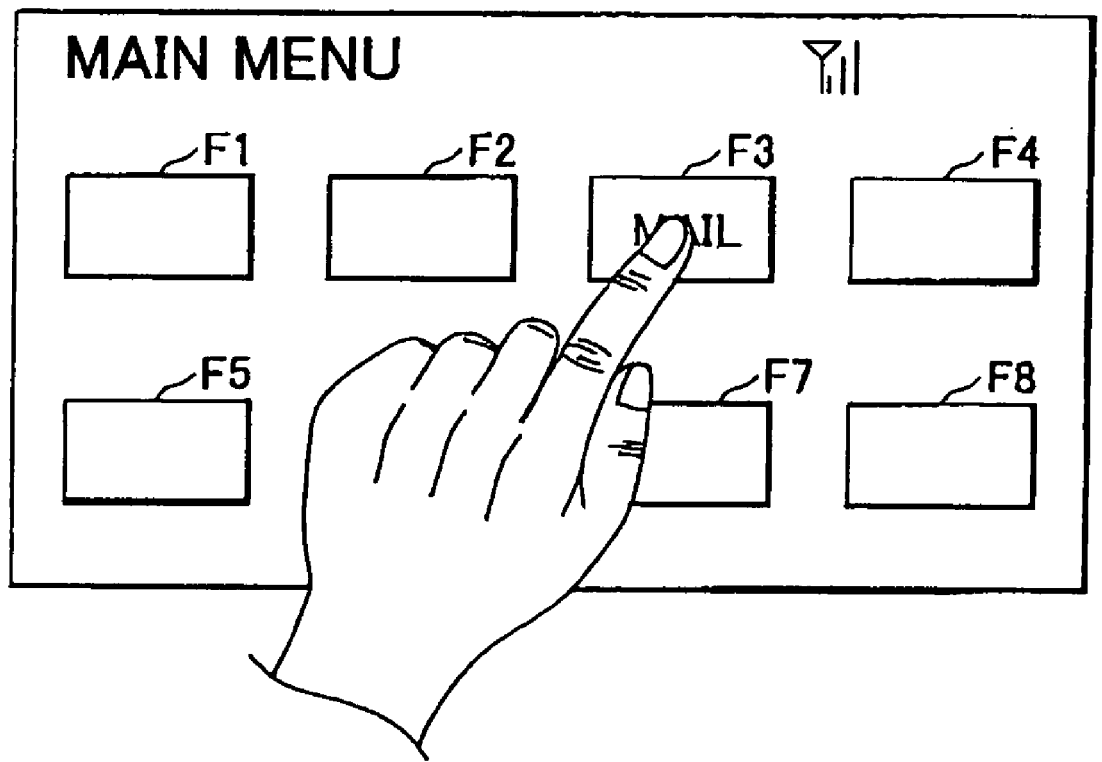
FIG. 9 is a diagram showing a stereoscopic image that is output in the case where a operating portion 20 is being operated from the driver's seat.

FIG. 9 is a diagram showing, as an example, a stereoscopic image that is output in the case where the operating portion 20 is being operated from the driver's seat side.

In the case where the operating portion 20 is being operated from the driver's seat side, a stereoscopic hand image is formed on the basis of the camera images from the two cameras 502, 503 that look obliquely downward at operating portion 20 from the driver's seat side as described above. Therefore, this stereoscopic hand image provides a stereoscopic vision of the hand viewed from the driver's seat side as shown in FIG. 9. Likewise, although not shown in the drawings, a stereoscopic hand image that is generated and output in the case where the operating portion 20 is being operated from the navigator's seat side provides a stereoscopic vision of the hand viewed from the navigator's seat side since the image is generated on the basis of the camera images from the two cameras 501, 502 that look obliquely downward at the operating portion 20 from the navigator's seat side. Thus, according to second embodiment, since the stereoscopic hand image is generated so as to provide a stereoscopic vision taken from the operator side, it is easier to grasp the situations above and below (in front and back) of a finger or fingers with respect to the operating portion 20 (therefore, the situations above and below the finger or fingers with respect to the operation menu image) than in first embodiment in which a stereoscopic hand image taken from perpendicularly above (see FIG. 5A or the like) is generated. Therefore, the operability further improves. That is, according to second embodiment, since the stereoscopic hand image is displayed in a stereoscopic manner that corresponds to the sight line direction from the operator, it is possible to give the eyes of the operator a sensation of the operator's hand virtually extending to the display portion 40. Therefore, the operability further improves.

Figure 5C:
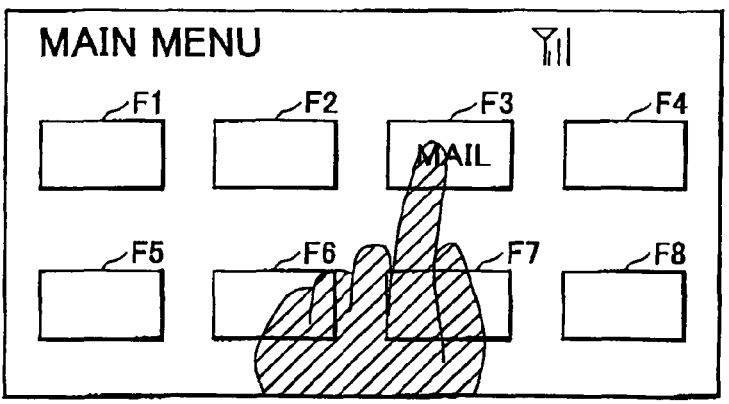
Figure 5D:
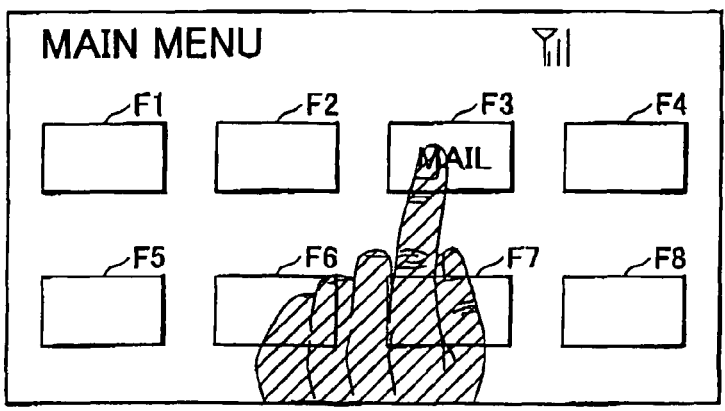

Incidentally, in second embodiment, too, the stereoscopic hand image may also be generated in other forms as shown in FIGS. 5B to 5D in conjunction with first embodiment.

With regard to second embodiment described above, modifications and improvements as described below are conceivable.

For example, although in second embodiment described above, the three cameras 501, 502, 503 are used, two cameras for each one of the navigator's seat side and the driver's seat side may be set. In this construction, a stereoscopic image may be generated by using the two camera provided on the driver's seat side (the two cameras being apart from each other in the vehicle width direction) in the case where the operating portion 20 is being operated from the driver's seat side. In the case where the operating portion 20 is being operated from the navigator's seat side, a stereoscopic image may be generated by using the two cameras provided on the navigator's seat side (the two cameras being apart in the vehicle width direction).

Figure 10A:
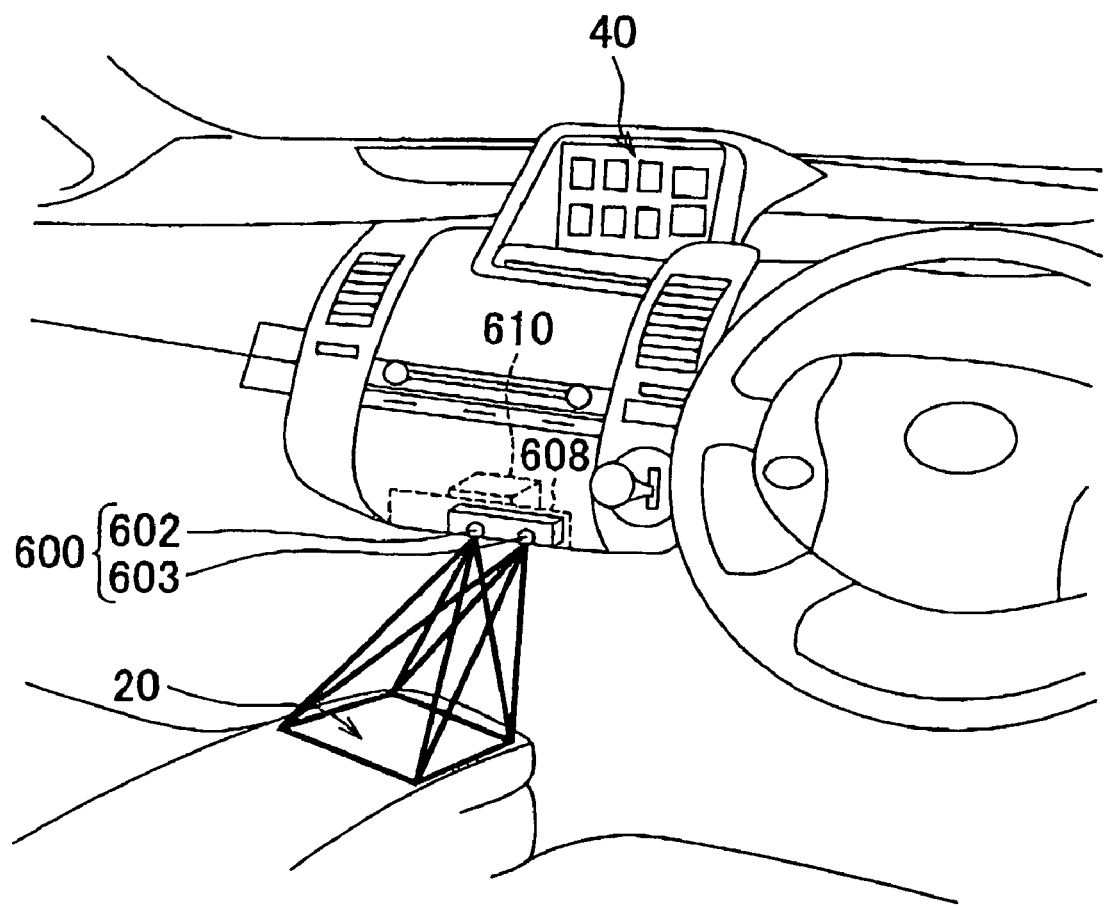
FIG. 10 is a diagram showing a construction provided with a stereo camera 600 movable in the vehicle width direction.
Figure 10B:
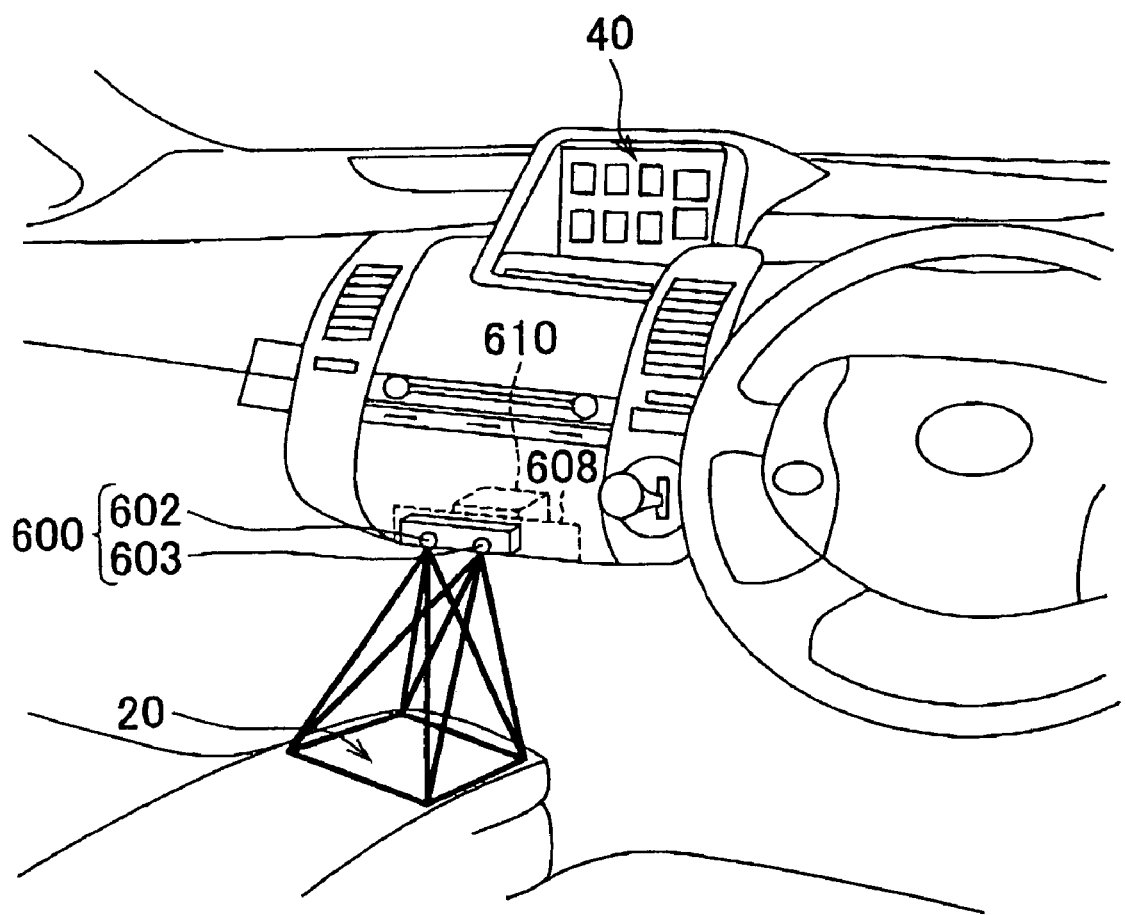

Furthermore, although in second embodiment described above, the three cameras 501, 502, 503 are used, a stereo camera 600 (including cameras 602, 603) movable in the vehicle width direction may be set as shown in FIGS. 10A and 10B. In this arrangement, the stereo camera 600 may be movably provided, for example, on a slide rail 608 that extends in the vehicle width direction, and may be driven by a drive source that is an appropriate actuator 610, such as an electric motor or the like. In the construction, in the case where the operating portion 20 is being operated from the driver's seat side, a stereoscopic image may be generated by using the stereo camera 600 after moving the stereo cameras 600 to the driver's seat side, as shown in FIG. 10A. In the case where the operating portion 20 is being operated from the navigator's seat side, a stereoscopic image may be generated by using the stereo camera 600 after moving the stereo camera 600 to the navigator's seat side, as shown in FIG. 10B.

Figure 11B:
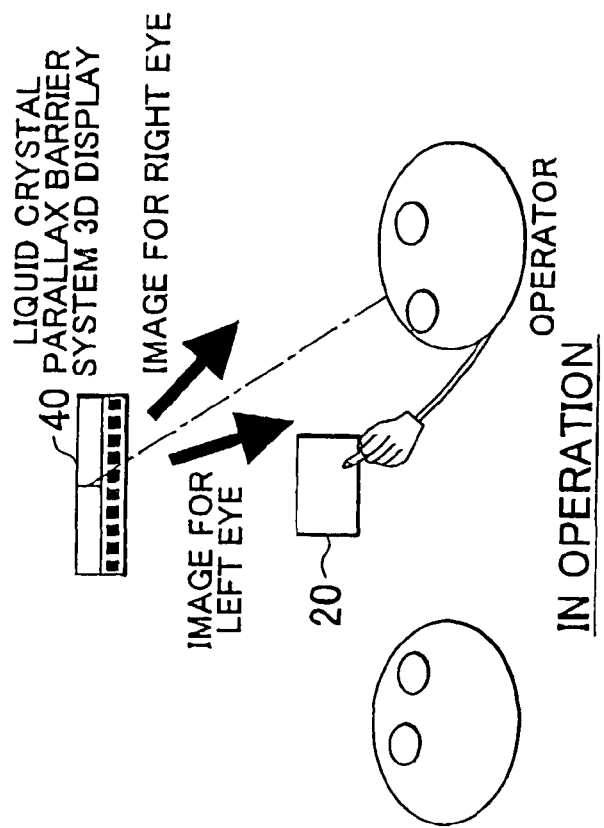
FIGS. 11A and 11B are views diagrammatically showing other modifications.
Figure 11A:
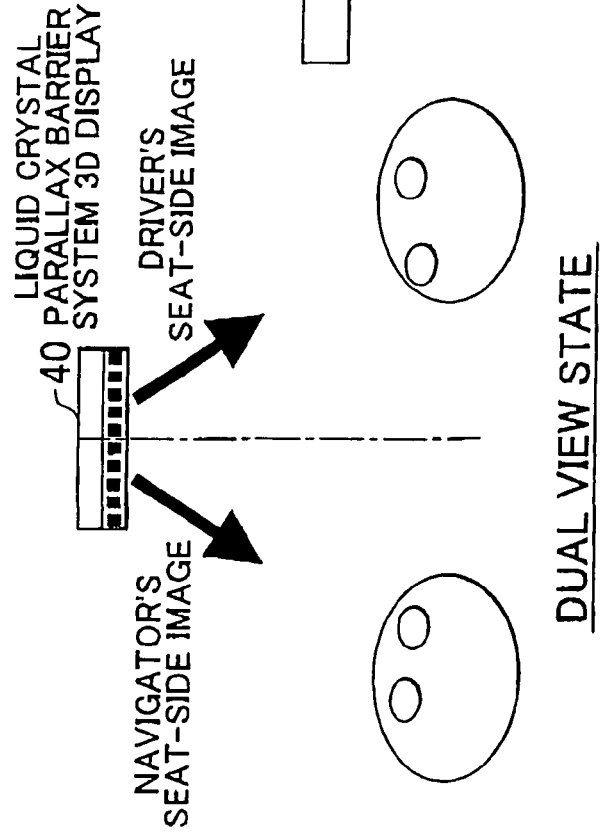

Furthermore, in the case where the display portion 40 is constructed of a liquid crystal parallax barrier system 3D display, a centrally divided dual view state may be formed as shown in FIG. 11 in an ordinary occasion, so that different images (a driver's seat-side image and a navigator's seat-side image) may be displayed in the left and right screen portions. If there is any operation performed on the operating portion 20, a stereoscopic image (a left-eye image+a right-eye image) in a stereoscopic view from the side of the operator (the driver in this case) as shown in FIG. 11 may be generated and output.

Third Embodiment

Third embodiment is different from first and second Embodiments described above, in that the graphic images F1 to F8 in the operation menu image that represent operation switches are also stereoscopically displayed. The component elements that may be the same as those of first embodiment are assigned with the same reference characters, and the descriptions thereof will be omitted.

Figure 12:
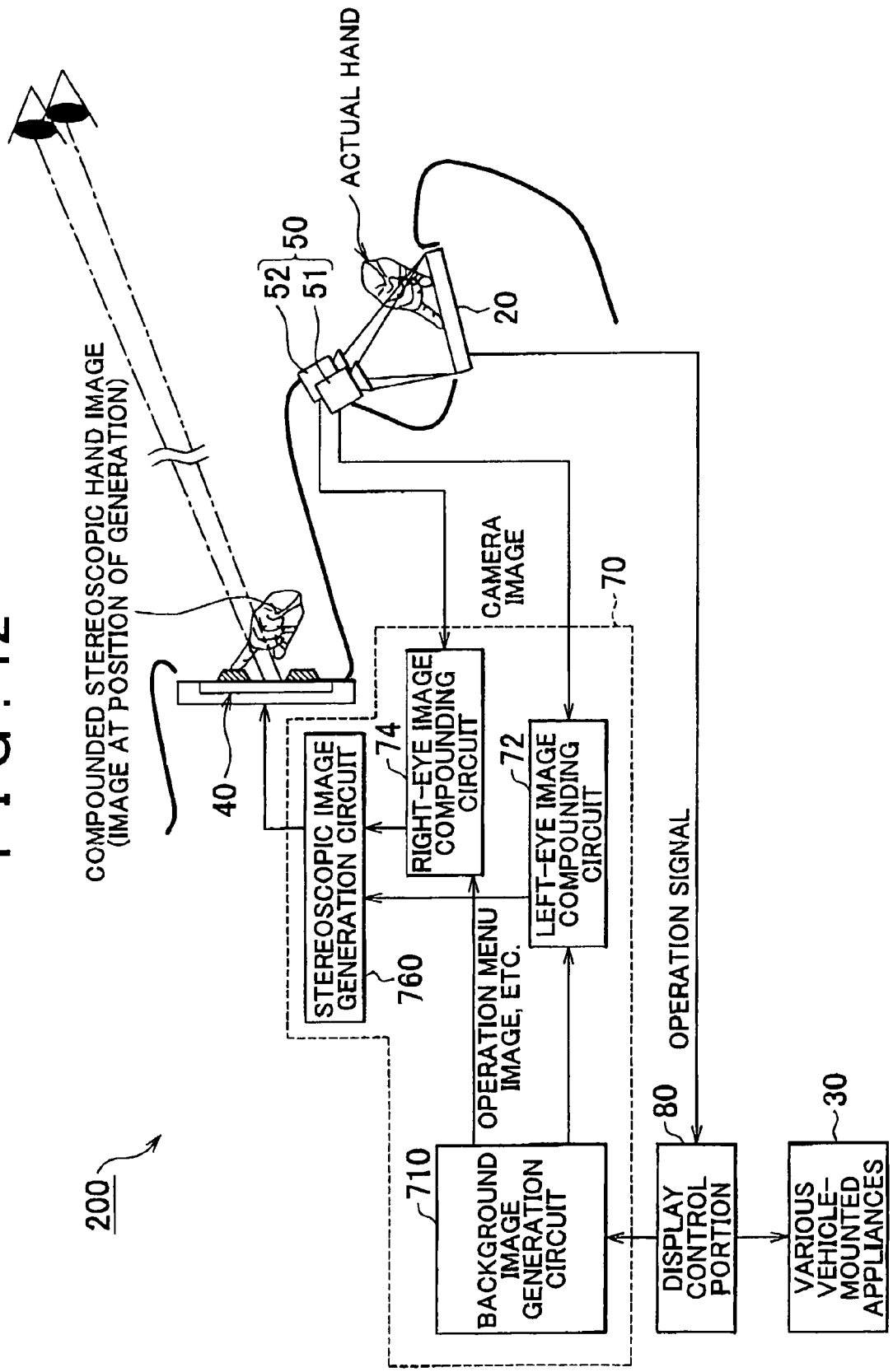
FIG. 12 is a schematic side sectional view of an operating device 200 in third embodiment.

FIG. 12 is a diagrammatic side sectional view of an operating device 200 in accordance with third embodiment.

The background image generation circuit 710 generates a background image (an operation menu image in this case) to be displayed in the display portion 40, and supplies the generated background image to the left-eye image compounding circuit 72 and the right-eye image compounding circuit 74. In this embodiment, the background image generation circuit 710, as shown in FIG. 13, generates the graphic images F1 to F8 in the operation menu image that represent the operation switches in the form of stereoscopic parallax display images.

The stereoscopic image generation circuit 760 generates a stereoscopic image that conforms with the display portion 40 that allows stereoscopic image to be viewed by naked-eye, on the basis of the left-eye image from the left-eye image compounding circuit 72 and the right-eye image from the right-eye image compounding circuit 74. In this occasion, the stereoscopic image generation circuit 760 generates the stereoscopic image so that the portion of the operation menu image excluding the graphic images F1 to F8 is reflected as a two-dimensional plane in the user's eyes and so that the hand image and the graphic images F1 to F8 of the operation menu image are reflected as three-dimensional solids in the user's eyes. In this embodiment, the stereoscopic image generation circuit 760 generates a stereoscopic image that provides a stereoscopic vision in which a plane offset by a predetermined height A [mm] from the display plane of the display portion 40 is set as a first reference plane of zero height and the heights of the individual fingers of the hand of the hand image relative to the first reference plane correspond to the actual heights of the fingers or sites of the hand relative to the operating portion 20. Besides, the stereoscopic image generation circuit 760 generates the graphic images F1 to F8 in the stereoscopic image so that upper surfaces 140 of the graphic images F1 to F8 (see FIGS. 14A and 14B) are stereoscopically seen with a predetermined height B [mm] relative to a reference plane of zero height that is the display plane of the display portion 40. The stereoscopic image generated by the stereoscopic image generation circuit 760 is displayed by the display portion 40.

Figure 13:
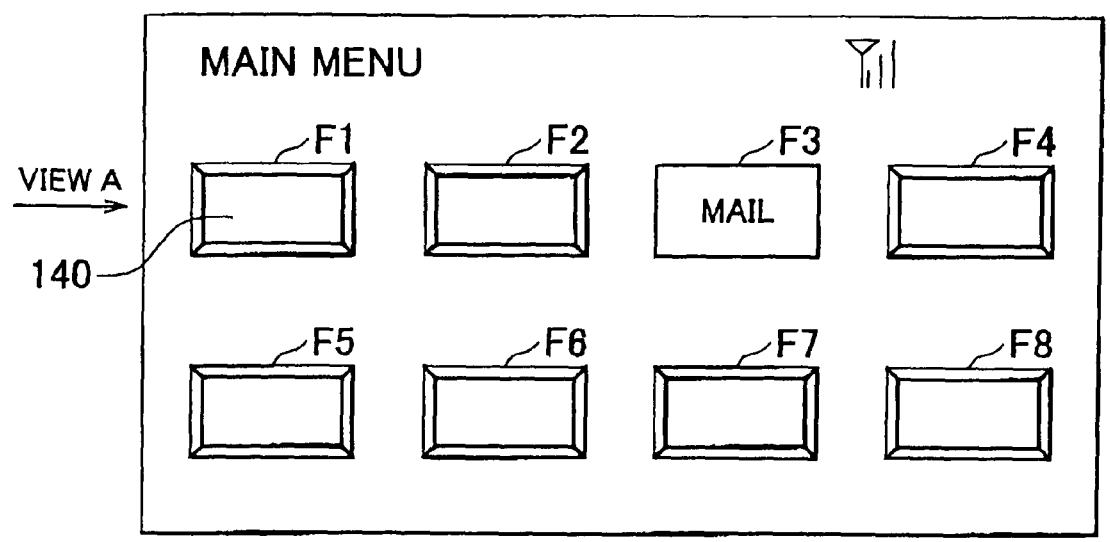
FIG. 13 is a diagram showing an example of graphic images F1 to F8 in an operation menu image shown in the display portion 40.

FIG. 13 is a diagram showing an example of the graphic images F1 to F8 in the operation menu image displayed in the display portion 40. The graphic images F1 to F8 in the operation menu image, as shown in FIG. 13, are stereoscopically displayed (displayed in a protruded fashion) so as to appear as if the upper surfaces 140 thereof existed at the predetermined height B [mm] to the operator side from the display plane of the display portion 40. Hereinafter, the graphic images F1 to F8 in the operation menu image that are stereoscopically displayed in this manner will be termed "the stereoscopic switch images". Incidentally, the graphic images representing the operation switches that cannot be operated during the running of the vehicle due to driving regulation or the like (the graphic image F3 in this example) may be two-dimensionally displayed, as shown in FIG. 13. This allows the user to easily recognize the operation switches that are presently not operable.

Figure 14A:
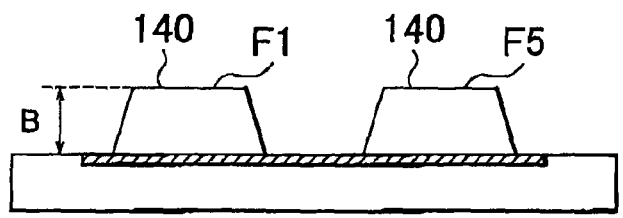
FIGS. 14A and 14B are diagrams schematically showing views of what is shown in FIG. 13 taken in a direction indicated by an arrow "view A" in FIG. 13.
Figure 14B:
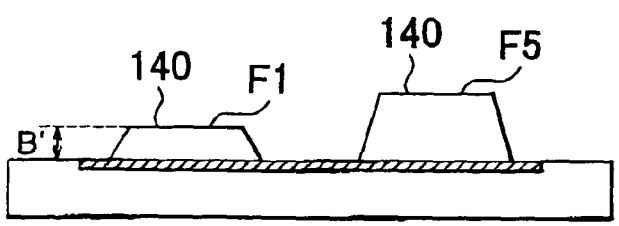

FIGS. 14A and 14B are diagrams schematically showing views of what is shown in FIG. 13 taken in a direction indicated by an arrow "view A". FIG. 14A shows a state in which the operation switches in the operating portion 20 that correspond to the stereoscopic switch images F1, F5 are not operated. FIG. 14B shows a state in which the operation switch in the operating portion 20 that corresponds to the stereoscopic switch image F1 has been operated, that is, has been turned on. In the case where a operation switch in the operating portion 20 is operated, the stereoscopic image generation circuit 760 changes the height of the upper surface 140 of the stereoscopic switch image corresponding to the operated operation switch (the stereoscopic switch image F1 in this example) to B' (<B) [mm] relative to the reference plane (the display plane of the display portion 40), on the basis of the operation signal (operation position signal) generated on the transparent touch panel. This allows the user to visually perceive that the user's operation on the operation switch has been detected by the operating device 200.

FIGS. 15A and 15B are diagrams schematically showing a relationship in relative height between the stereoscopic switch image and the stereoscopic hand image. FIG. 15A shows a relationship in height between a user's hand and the operation surface (the touch panel surface) on the operating portion 20. FIG. 15B shows a relationship in height between the stereoscopic switch images and the stereoscopic hand image in the display portion 40 that corresponds to the state shown in FIG. 15A.

When the user's finger tip comes to such a position as to contact the operation surface (i.e., comes to the zero position in the y coordinate in the drawing) as shown in FIG. 15A, the finger tip G in the stereoscopic hand image appears at the position of a predetermined height A (a height along the Y axis) relative to the display plane of the display portion 40 as shown in FIG. 15B. At this time, if the predetermined height A is set so as to be equal to the height B of the upper surface 140 of the stereoscopic switch images (i.e., so as to have a relationship of A=B), the display portion 40 produces a stereoscopic display in which the finger tip G in the stereoscopic hand image is touching the upper surface 140 of the stereoscopic switch image as shown in FIG. 15B. That is, a stereoscopic display in which the finger tip G in the stereoscopic hand image is placed on the upper surface 140 of the stereoscopic switch image is produced. Therefore, the actual state of contact with the touch panel of the operating portion 20 and the state of the stereoscopic display in the display portion 40 conform with each other, so that user operability improves.

Incidentally, if from the state shown in FIG. 15A, the user depresses the operation surface (performs a switching operation), the operation switch in the operating portion 20 turns on, and the stereoscopic switch image is stereoscopically displayed so as to appear as if the mechanical switch were depressed (see a one-dot chain line). Therefore, the user can have a virtually real operation perception, that is, can feel as if the user had operated an actual hardware switch.

If from the state shown in FIG. 15A, the user's hand moves away from the operation surface (e.g., moves away to a height h in the y coordinate), the finger tip G in the stereoscopic hand image comes to a position of a height H (a height along the Y axis in the drawing) relative to the display plane of the display portion 40). This height H may be equal to h+A, or may also be equal to h'+A depending on the scaling factor of the stereoscopic image or the like, where h'=k·h (k is a constant).

According to third embodiment, the stereoscopic switch images and the stereoscopic hand image can be displayed with an appropriate height relationship therebetween by displaying the stereoscopic switch images and displaying the stereoscopic hand image with an offset of the height corresponding to the height of the stereoscopic switch images as described above. Therefore, the user can more easily grasp the sense of the distance of the hand to the operation switches of the operating portion 20, and can have a virtually real operation perception, so that operability improves.

With regard to third embodiment described above, modifications and improvements as described below are conceivable.

For example, although in the foregoing embodiment, the predetermined height A is set so as to be equal to the height B of the upper surfaces 140 of the stereoscopic switch images, it suffices that the predetermined height A be substantially equal to the height B of the upper surfaces 140 of the stereoscopic switch images. For example, the predetermined height A may be an appropriate value selected from the range of the height being less than or equal to the height B and being greater than or equal to the height B' of the upper surface 140 of any one of the stereoscopic switch image in an operated state. For example, the predetermined height A may be A=(B−B')/2+B'. Or, the predetermined height A may be a value that is slightly greater than the height B of the upper surfaces 140 of the stereoscopic switch images.

In the case where the display portion 40 is constructed of a three-dimensional display capable of displaying a recessed image, the stereoscopic switch image corresponding to an operation switch operated by a user may be stereoscopically displayed as a recessed image (i.e., the height B' may be a minus value).

While the preferred embodiments of the invention have been described, the invention is not restricted by the foregoing embodiments. On the contrary, the foregoing embodiments may also be provided with various modifications and replacements without departing from the scope of the invention.

For example, the circuit construction of the display image generation circuit 70 shown in FIGS. 2 and 8 is a mere example, and the function of a portion of the circuit may be realized by another circuit. Furthermore, with regard to the circuit construction of the display image generation circuit 70 shown as a mere example in FIGS. 2 and 8, the function of a portion of a circuit may be realized by software. For example, a portion or the whole of the display image generation circuit 70 may be constructed of a microcomputer, and the functions thereof may be realized by firmware. Furthermore, a portion or the whole of the display image generation circuit 70 and the function of the display control portion 80 shown in the FIGS. 2 and 8 may be incorporated, for example, in an ECU of a navigation system.

In the foregoing embodiments, the operation on the operating portion 20 is possible, and therefore, the display in the display portion 40 does not need to be of a touch panel type. However, the display in the display portion 40 may be of a touch panel type.

Furthermore, in the foregoing embodiments, the operation menu image may be an image obtained by superimposing graphic images that correspond to the operation switches of the operating portion 20 on another image, for example, an image obtained by superimposing the graphic images of the operation switches on various images, such as a TV image, a DVD image being reproduced, etc., a map image of a navigation system, or the like.

Furthermore, although in the foregoing preferable embodiments, the operating devices 10, 100 are embodied as operating devices for vehicles, the invention is not limited so. The invention is applicable to operating devices for use in other applications as well.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the invention.

What is claimed is:

1. An operating device comprising:
    an operating portion in which an operation switch is disposed, the operating portion being disposed between a driver's seat and a navigator's seat and being arranged in a vehicle width direction within a cabin;
    a display that displays a stereoscopic image, the display being disposed between the driver's seat and the navigator's seat and being arranged in the vehicle width direction within the cabin;
    an image pickup mechanism that includes at least two image pickup devices that look obliquely downward at the operating portion from a driver's seat side and are arranged in the vehicle width direction and takes pictures of a hand of a user operating the operating portion, from a plurality of directions;
    a displayed image generation device that generates a stereoscopic image of the hand based on parallax images obtained from the at least two image pickup devices; and
    an operator determination portion that determines whether the operating portion is being operated from the driver's seat side or from a navigator's seat side, wherein
    a compounded image obtained by compounding an operation menu image that depicts a position of the operation switch in the operating portion and a function of the operation switch, and the stereoscopic image of the hand generated by the displayed image generation device is displayed in the display, and
    the displayed image generation device generates the stereoscopic image of the hand in a sight line direction from the driver's seat side if it is determined by the operator determination portion that the operating portion is being operated from the driver's seat side, and the displayed image generation device generates the stereoscopic image in a sight line direction from the navigator's seat side if it is determined by the operator determination portion that the operating portion is being operated from the navigator's seat side.

2. The operating device according to claim 1, wherein:

the image pickup mechanism includes three or more image pickup devices that are apart from each other in the vehicle width direction;

the displayed image generation device generates the stereoscopic image of the hand based on the parallax images obtained from two image pickup devices provided at the driver's seat side if it is determined by the operator determination portion that the operating portion is being operated from the driver's seat side; and the displayed image generation device generates the stereoscopic image of the hand based on the parallax images obtained from two image pickup devices provided at the navigator's seat side if it is determined by the operator determination portion that the operating portion is being operated from the navigator's seat side.

3. The operating device according to claim 1, wherein:

the image pickup mechanism includes two image pickup devices that are movable in the vehicle width direction;

the displayed image generation device moves the two image pickup devices based on a result determined by the operator determination portion in the vehicle width direction, and the displayed image generation device generates the stereoscopic image of the hand based on the parallax images obtained from two image pickup devices moved to the driver's seat side if it is determined by the operator determination portion that the operating portion is being operated from the driver's seat side, and the displayed image generation device generates the stereoscopic image of the hand based on the parallax images obtained from two image pickup devices moved to the navigator's seat side if it is determined by the operator determination portion that the operating portion is being operated from the navigator's seat side.

4. The operating device according to claim 1, wherein the displayed image generation device stereoscopically displays, in the display, an image portion in the operation menu image that represents the operation switch, and displays the stereoscopic image of the hand while using a first reference plane of zero height that is a plane offset by a predetermined height from a display plane of the display.

5. The operating device according to claim 4, wherein the image portion in the operation menu image that represents the operation switch is stereoscopically displayed while the display plane of the display is used as a second reference plane of zero height, and the predetermined height by which the reference plane of zero height is offset from the display plane of the display is substantially equal to a stereoscopic height of the image portion that represents the operation switch.

6. The operating device according to claim 4, wherein the height of a finger of the hand displayed in the stereoscopic image of the hand from the display plane of the display when the finger touches the operating portion is substantially equal to a stereoscopic height of the image portion that represents the operation switch in the operation menu image.

* * * * *